(12) United States Patent
Oldigs et al.

(10) Patent No.: US 6,898,997 B2
(45) Date of Patent: May 31, 2005

(54) APPARATUS AND METHOD FOR STRIPPING INSULATED WIRE

(75) Inventors: Richard W. Oldigs, Huffman, TX (US); Harry L. Vanscoder, Pasadena, TX (US); Scott S. Chesser, Richmond, TX (US); Ricky Y. Torres, Manvel, TX (US); Gary A. Hazen, Houston, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 63 days.

(21) Appl. No.: 10/249,936

(22) Filed: May 20, 2003

(65) Prior Publication Data

US 2004/0231466 A1 Nov. 25, 2004

(51) Int. Cl.[7] .................................................. H02G 1/12
(52) U.S. Cl. .............................. 81/9.4; 81/9.51; 219/233
(58) Field of Search .................... 81/9.4, 9.51; 219/233, 219/240, 227, 229, 241

(56) References Cited

U.S. PATENT DOCUMENTS

| | | | |
|---|---|---|---|
| 3,752,017 A | 8/1973 | Lloyd et al. | |
| 3,980,861 A | 9/1976 | Fukunaga | |
| 4,241,628 A | 12/1980 | Sindelar | |
| 4,261,230 A | 4/1981 | Sindelar | |
| 4,558,613 A | * 12/1985 | Nespor | ......................... 81/9.4 |
| 4,672,865 A | 6/1987 | Nespor | |
| 5,016,500 A | 5/1991 | Conrad et al. | |
| 5,832,790 A | * 11/1998 | Lostumo et al. | ............. 81/9.51 |
| 2001/0000354 A1 | 4/2001 | Nazerian et al. | |

* cited by examiner

Primary Examiner—Lee D. Wilson
Assistant Examiner—Alvin J. Grant
(74) Attorney, Agent, or Firm—Victor H. Segura; Brigitte L. Echols

(57) ABSTRACT

An apparatus for stripping an insulated wire includes a resistive heater element having a first end, a second end, and a coil formed between the first end and the second end. The coil has an inner diameter that is large enough to receive a section of the insulated wire. The apparatus further includes an electronic circuit connected to the first and second ends to deliver power to the resistive heater element such that the coil uniformly distributes heat about the section of the insulated wire to thermally decompose insulation on the section of insulated wire.

8 Claims, 3 Drawing Sheets

APPARATUS AND METHOD FOR STRIPPING INSULATED WIRE

BACKGROUND OF INVENTION

The invention relates generally to apparatus and methods for stripping insulated wires. More specifically, the invention relates to an apparatus and a method for stripping a magnet wire.

The term "magnet wire" as used herein is intended to mean an electrical wire fabricated by forming a polymer-based film, e.g., polyester-amide, polyester-amide-imide, polyimide, and polyurethane, on a solid conductor wire, where the polymer-based film serves as insulation. The polymer-based film provides a uniform dielectric coating without significantly increasing the overall diameter of the magnet wire. The thickness of the insulation formed on the conductor wire is known as build. The industry standards are as follows: single, heavy (or double), triple, and quad. Single and heavy builds are the most common. Table 1 below shows nominal dimensions for a copper magnet wire.

TABLE 1

| Size (AWG) | Bare Diameter (mm) | Single Build Diameter (mm) | Heavy Build Diameter (mm) |
|---|---|---|---|
| 26 | 0.4039 | 0.4318 | 0.4521 |
| 30 | 0.2540 | 0.2769 | 0.2946 |
| 35 | 0.1422 | 0.1575 | 0.1702 |
| 40 | 0.0787 | 0.0889 | 0.0965 |
| 44 | 0.0508 | 0.0559 | 0.0635 |

It is necessary to remove insulation from a section of a magnet wire to allow for soldering. The main difficulty in stripping a magnet wire is that the insulation layer is so thin that it is fairly easy to damage the conductor wire during insulation removal. For example, according to Table 1 above, a heavy-build 40 AWG magnet wire has an insulation thickness of about 0.0178 mm.

Prior-art mechanical stripping methods generally involve gripping the insulation wire at two places, severing the insulation between the two places with a pair of opposed blades selected for the gauge of wire, and pulling the severed insulation off the wire. Prior-art thermal stripping methods involve heating the opposed blades used in severing the insulation. These mechanical and thermal stripping methods are generally limited to large-diameter insulated wires, e.g., 30 AWG or larger. Chemical methods can be used to strip insulation wire provided that the wire is easily accessible.

From the foregoing, there is desired an apparatus and a method for stripping insulated wire regardless of wire diameter or accessibility.

SUMMARY INVENTION

In one aspect, the invention relates to an apparatus for stripping an insulated wire which comprises a resistive heater element having a first end, a second end, and a coil formed between the first end and the second end. The coil has an inner diameter that is large enough to receive a section of the insulated wire. The apparatus further comprises an electronic circuit connected to the first and second ends to deliver power to the resistive heater element such that the coil uniformly distributes heat about the section of the insulated wire to thermally decompose the insulation on the section of insulated wire.

In another aspect, an apparatus for stripping an insulated wire comprises a handle, an electrical connector disposed in the handle, and a resistive heater element having first and second ends coupled to the electrical connector and a coil formed between the first and second ends. The coil has an inner diameter large enough to receive a section of the insulated wire. The coil uniformly distributes heat about the section of the insulated wire so as to thermally decompose the insulation on the section of insulated wire. The apparatus further comprises a control system which delivers power to the resistive heater element through the electrical connector.

In yet another aspect, the invention relates to a method of stripping an insulated wire which comprises inserting a section of the insulated wire into a coil of a resistive heater element, delivering power to the resistive heater element to heat up the coil, using the coil to uniformly distribute heat about the section of the insulated wire for a predetermined time sufficient to thermally decompose an insulation on the section of the insulated wire, removing the section of the insulated wire from the coil, and removing the thermally-decomposed insulation from the section of the insulated wire.

Other features and advantages of the invention will be apparent from the following description and the appended claims.

DETAILED DESCRIPTION

The invention will now be described in detail with reference to a few preferred embodiments, as illustrated in accompanying drawings. In the following description, numerous specific details are set forth in order to provide a thorough understanding of the invention. It will be apparent, however, to one skilled in the art, that the invention may be practiced without some or all of these specific details. In other instances, well-known features and/or process steps have not been described in detail in order to not unnecessarily obscure the invention. The features and advantages of the invention may be better understood with reference to the drawings and discussions that follow.

Figure 1A:
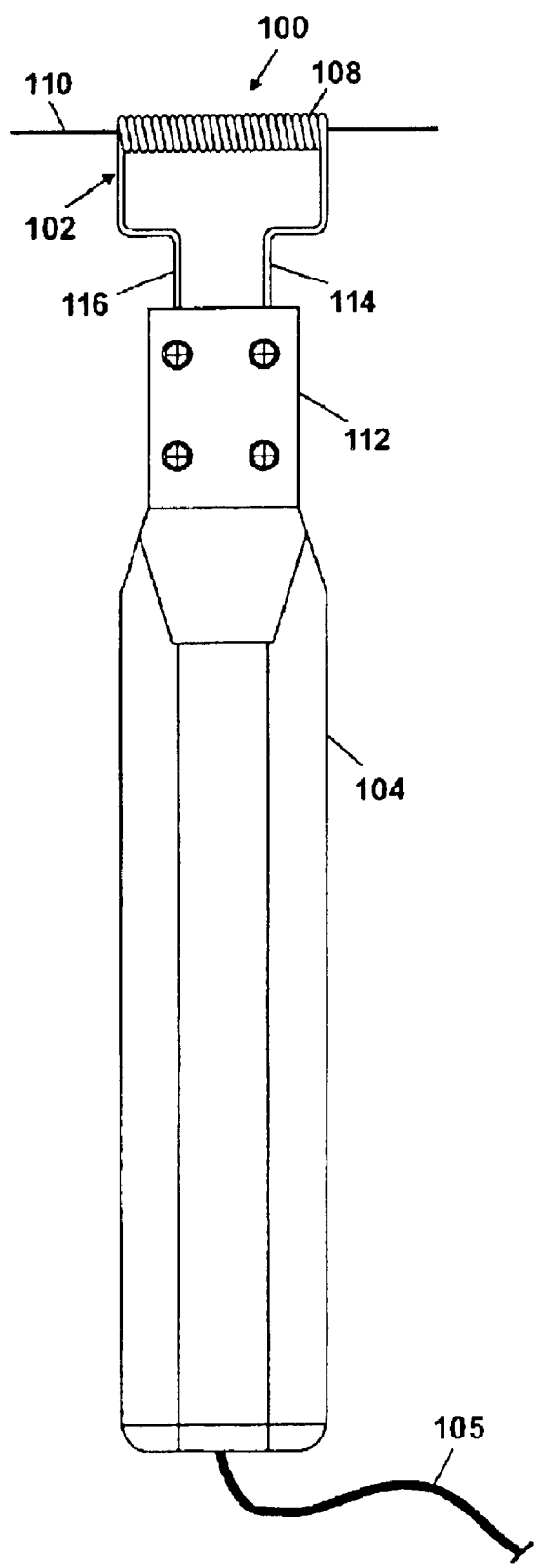
FIG. 1A is a schematic of a thermal stripper according to an embodiment of the invention.
Figure 1B:
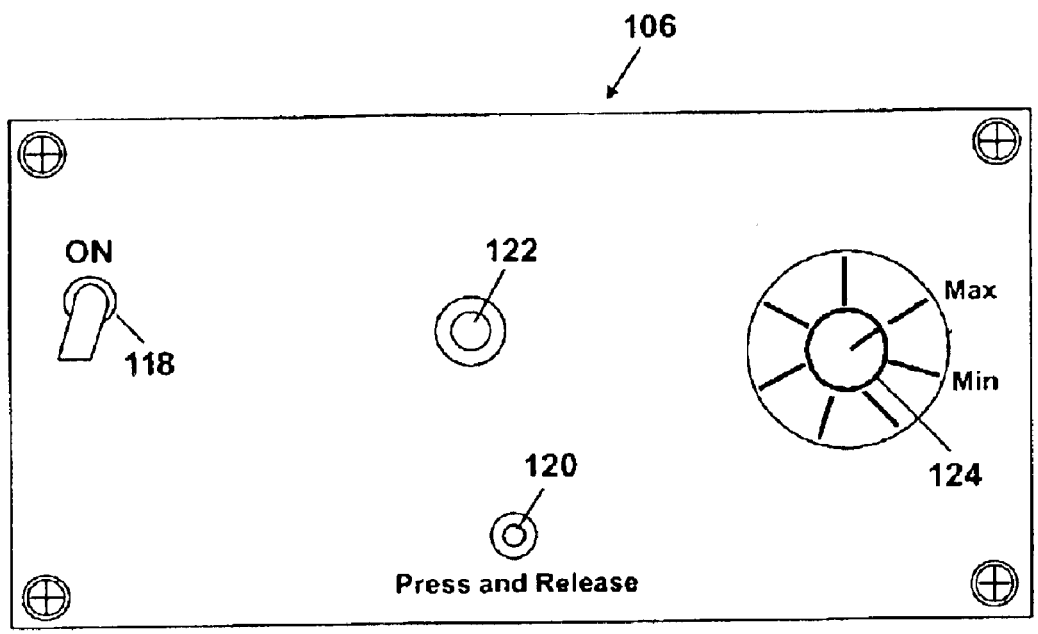
FIG. 1B is a top view of a stripper control box according to an embodiment of the invention.
Figure 1C:
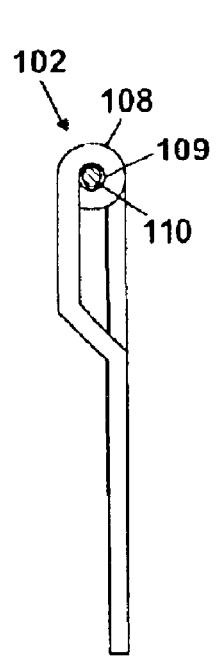
FIG. 1C is a side view of the stripper heater element shown in FIG. 1A.

For illustration purposes, FIG. 1A shows a thermal stripper 100 according to one embodiment of the invention. The thermal stripper 100 includes a stripper heater element 102 and a stripper handle 104. The stripper handle 104 includes a cable 105 for connection to a stripper control box (106 in FIG. 1B). The stripper heater element 102 is made of a resistive heater material, such as Nichrome or Inconel. The stripper heater element 102 includes a coil 108 made of a predetermined number of turns to achieve a desired resistance. As shown in FIG. 1C, the coil 108 has an inner diameter 109 large enough to receive a magnet wire 110. Returning to FIG. 1A, power is delivered to the stripper heat element 102 through the cable 105. This power causes the stripper heater element 102 to heat up and distribute heat uniformly about the section of the magnet wire 110 inserted in the coil 108. The heat is delivered until the insulation on the section of the magnet wire 110 inserted in the coil 108 thermally decomposes. The magnet wire 110 is then removed from the coil 108. The thermally-decomposed insulation can be removed easily, e.g., by wiping it with a rag or by sanding it off with a fine sand paper.

Figure 2:
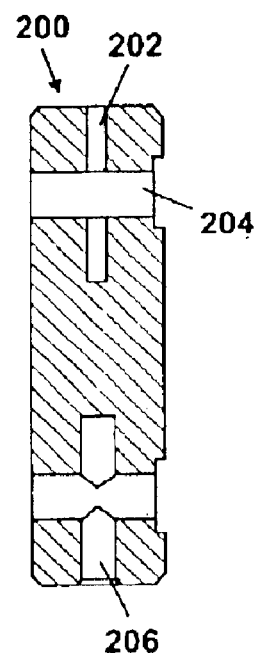
FIG. 2 is a cross-section of an electrical conductor mounted inside the stripper handle shown in FIG. 1A.

In one embodiment of the invention, two electrical conductors (not shown in this figure) are situated at the upper end 112 of the stripper handle 104 to allow an electrical connection to be made between the stripper heater element 102 and the cable 105. FIG. 2 shows a cross-section of one of these electrical conductors, indicated by reference numeral 200. The electrical conductor 200 includes an aperture 202 for receiving one of the ends (114 or 116 in FIG. 1A) of the stripper heater element (102 in FIG. 1A). A screw (not shown) can be inserted through an opening 204, which intersects with the aperture 202, to secure the uncoiled end of the stripper heater element to the electrical conductor 200 and ensure electrical contact between the stripper heater element and the electrical conductor 200. However, the invention is not limited to a screw-type connection between the stripper heater element and the electrical conductor 200. A crimp-type connection or other suitable electrical connection could be used, for example. The screw can also be used to secure the electrical conductor 200 to the stripper handle (104 in FIG. 1A). The electrical conductor 200 includes another aperture 206 for connecting the electrical conductor 200 to the electrical cable 105.

Figure 3:
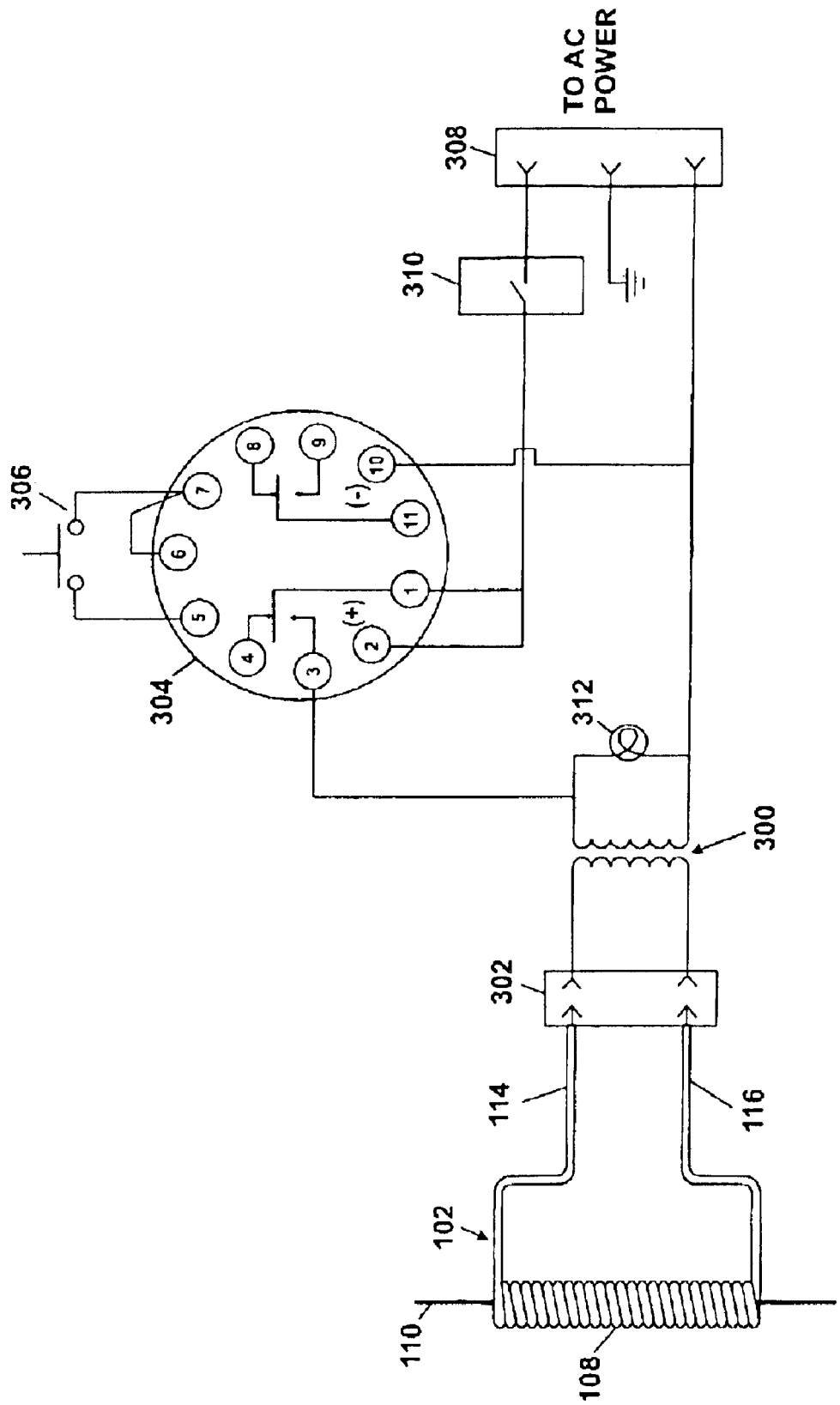
FIG. 3 is a thermal stripper wiring diagram according to an embodiment of the invention.

FIG. 3 shows a thermal stripper wiring diagram according to an embodiment of the invention. In the wiring diagram, the ends 114, 116 of the stripper heater element 102 are coupled to a transformer 300 through a connector 302. The connector 302 could be provided by two of the electrical conductors 200 in FIG. 2 or other suitable electrical connection means. The step-down transformer 300 is connected to selected pins on a relay timer 304. The relay timer could be a programmable one-shot relay timer, for example. The relay timer 304 is connected to a contact switch 306, which is operable by a "START" pushbutton (120 in FIG. 1B) on the stripper control box (106 in FIG. 1B). The relay timer 304 is connected to AC power via a connector 308. Typically, 120V AC power is delivered to the transformer 300 through the relay timer 304, and the transformer 300 steps this power down to 5V prior to delivering it to the stripper heater element 102. Delivery of AC power to the connector 308 can be turned on or off via a power switch (118 in FIG. 1B) on the stripper control box. For safety reasons, a circuit breaker 310 is provided in the connection between the relay timer 304 and the connector 308 to prevent current flow through the circuit should the circuit become overloaded. A power "ON" indicator 312 (122 in FIG. 1) is coupled to the step-down transformer 300 to indicate when power is being delivered to the stripper heater element 102.

In operation, the magnet wire 110 is inserted in the coil 108 of the stripper heater element 102. The contact switch 306 is then closed to activate the relay timer 304 When the relay timer 304 is activated, power is delivered to the stripper heater element 102 via the step-down transformer 300. The coil 108 distributes heat uniformly about the section of the magnet wire 110 within the coil 108 as previously discussed and thermally decomposes, i.e., volatizes or carbonizes, the insulation on the section of the magnet wire 110. The time for which the relay timer 304 is ON is set through a timer setting dial (124 in FIG. 1B) on the stripper control box (106 in FIG. 1B). When the set time expires, the contact switch 306 opens, cooling the stripper heater element 102, including the coil 108, and the magnet wire 110. The magnet wire 110 is then removed from the stripper heater coil 108, and the thermally-decomposed insulation is removed from the magnet wire 110, e.g., by wiping the insulation off with a rag or by sanding the insulation off with a fine sand paper. The gripping action provided by sanding is generally convenient for further handling of the magnet wire. In general, the ON-time of the relay timer 304 is set to an amount such that the insulation on the magnet wire is fully decomposed without significant damage to the underlying conductor wire. Some calibration may be necessary to determine the ON-time of the relay timer 304. For a Nichrome stripper heater element having a resistance of 1.2 1©, an ON-time of approximately 5 seconds has been found to be adequate.

The invention provides one or more advantages. The thermal stripper removes insulation on a conductor wire by thermally decomposing the insulation without damaging the conductor wire. The invention does not involve severing the insulation with blades, a process that could damage the conductor wire, especially when the insulation layer is very thin, such as for wires having sizes smaller than 30 AWG, or use of chemicals, which can contaminate or corrode the conductor wire. The thermal stripper can be used to safely and easily remove the insulation regardless of the diameter and accessibility of the insulated wire. For example, the thermal stripper can be used to remove insulation even when the insulated wire is in a confined space, such as after winding or wrapping the insulated wire in electrical or electronic equipment. The stripper heater element included in the thermal stripper can be positioned with relative ease, providing accurate control of the wire length to be stripped. Further, the heating duration and diameter of the stripper heater coil can be accurately controlled to allow stripping of an insulated wire of any diameter. Further, a single stripper heater coil can be used for several wire gauges as long as the diameter of the heater coil is large enough to receive the wire gauge.

It is worth noting herein that the stripper heater element described above is not intended for use with insulated wires having insulation that is likely to melt at the operating temperature of the stripper heater element. Melting of the insulation is undesirable because the melted insulation may stick to the stripper heater coil, making it difficult to remove the wire from the stripper heater coil and to reuse the stripper heater coil for stripping. Preferably, the stripper heater element is used with magnet wires or other insulated wires having insulation that volatizes or carbonizes easily without melting.

It is also worth noting herein that various kinds of electronic circuits can be used to deliver power to the stripper heater element. In other words, the invention is not limited to the electronic circuit shown in FIG. 3.

For the purposes of this specification it will be clearly understood that the word "comprising" means "including but not limited to", and that the word "comprises" has a corresponding meaning.

What is claimed is:

1. An apparatus for stripping an insulated wire, comprising:
 a resistive heater element having a first end, a second end, and a coil formed between the first end and the second end, the coil having an inner diameter large enough to receive a section of the insulated wire; and
 an electronic circuit connected to the first and second ends to deliver power to the resistive heater element such that the coil uniformly distributes heat about the section of the insulated wire to thermally decompose insulation on the section of insulated wire wherein the electronic circuit comprises a relay timer adapted to deliver the power to the resistive heater element through a transformer for a predetermined time sufficient to thermally decompose the insulation.

2. The apparatus of claim 1, wherein the insulated wire is a magnet wire.

3. An apparatus for stripping an insulated wire, comprising:

a handle;

an electrical connector disposed in the handle;

a resistive heater element having first and second ends coupled to the electrical connector and a coil formed between the first and second ends, the coil having an inner diameter large enough to receive a section of the insulated wire, the coil for uniformly distributing heat about the section of the insulated wire so as to thermally decompose an insulation on the section of the insulated wire; and a control system which delivers power to the resistive heater element through the electrical connector.

4. The apparatus of claim 3, wherein the control system comprises a relay timer for triggering delivery of power to the resistive heater element.

5. The apparatus of claim 4, wherein the control system further comprises a transformer for controlling amount of power delivered to resistive heater element.

6. A method of stripping an insulated wire, comprising:

inserting a section of the insulated wire into a coil of a resistive heater element;

activating a relay timer and delivering power to the resistive heater element through a transformer to heat up the coil;

using the coil to uniformly distribute heat about the section of the insulated wire for a predetermined time sufficient to thermally decompose an insulation on the section of the insulated wire;

removing the section of the insulated wire from the coil; and removing the thermally-decomposed insulation from the section of the insulated wire.

7. The method of claim 6, wherein removing the thermally-decomposed insulation comprises wiping the thermally-decomposed insulation off the section of the insulated wire.

8. The method of claim 6, wherein removing the thermally-decomposed insulation comprises sanding the thermally-decomposed insulation off the section of the insulated wire.

* * * * *